United States Patent
Yoneyama

(10) Patent No.: US 6,743,535 B2
(45) Date of Patent: Jun. 1, 2004

(54) STRUCTURE FOR PREVENTING REVERSE INSERTION OF A STORAGE BATTERY

(75) Inventor: Kazuo Yoneyama, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 338 days.

(21) Appl. No.: 09/933,045

(22) Filed: Aug. 21, 2001

(65) Prior Publication Data

US 2002/0025455 A1 Feb. 28, 2002

(30) Foreign Application Priority Data

Aug. 23, 2000 (JP) ........................................ 2000-253093

(51) Int. Cl.⁷ ............................................... H01M 2/00
(52) U.S. Cl. ............................. 429/1; 429/96; 429/98; 429/100; 429/163; 429/170; 429/176; 429/179; 429/186
(58) Field of Search ................................ 429/1, 96, 98, 429/100, 163, 170, 176, 186, 179

(56) References Cited

U.S. PATENT DOCUMENTS 6,521,370 B1 * 2/2003 Takeshita et al. ............. 429/96

* cited by examiner

Primary Examiner—Bruce F. Bell
(74) Attorney, Agent, or Firm—Nixon & Vanderhye P.C.

(57) ABSTRACT

A storage battery includes a housing, a groove portion formed on one end surface of the housing, a pair of electrode terminals formed on one end surface of the groove portion, and an engaging concave portion formed in the vicinity of the other end surface on the upper surface of the housing. A battery housing portion includes a housing concave portion capable of housing the storage battery, a pair of connection terminals formed on one inner wall of the housing concave portion to be connected to the electrode terminals of the storage battery, a convex portion formed in a protruded manner at a position corresponding to the groove portion on the one inner wall, and an engaging protrusion portion formed in a protruded manner at a position corresponding to the engaging concave portion on the other inner wall of the housing concave portion. When the storage battery is properly inserted into the battery housing portion, the groove portion and the convex portion are engaged with each other, the engaging concave portion and the engaging protrusion are engaged with each other, and the electrode terminals and the connection terminals are electrically connected to each other.

6 Claims, 4 Drawing Sheets

(a)

(b)

(c)

(a)

(b)

(c)

(b)

STRUCTURE FOR PREVENTING REVERSE INSERTION OF A STORAGE BATTERY

FIELD OF THE INVENTION

This invention generally relates to a structure for preventing the reverse insertion of a storage battery as well as a storage battery and battery housing portion to be used for the same purpose. More particularly, the invention relates to a structure for preventing the reverse insertion of a storage battery into a battery housing portion integrally formed on a charger or electronic appliance such as a portable electronic game machine and a storage battery and battery housing portion to be used for the same purpose.

BACKGROUND AND SUMMARY OF THE INVENTION

A prior storage battery exists in which a concave portion and a convex portion are provided in the vicinity of the battery electrode terminals and connection terminals of a battery housing portion. If the concave portion and the convex portion are engaged with each other and do not correspond to each other, it is impossible to insert the storage battery normally. According to this structure, if the storage battery is inserted in a reverse manner, it is possible to prevent an accidental electrical connection from occurring between the electrode terminals and the connection terminals due to the failure of engagement between concave and convex portions.

In this prior art configuration, since a reverse insertion preventing portion is formed on only one location at one end surface (e.g., the surface formed with a pair of terminals) in the longitudinal direction of a storage battery or a secondary battery. Although an electrical connection between terminals by the reverse insertion of the storage battery can be prevented, it is impossible to prevent the reverse insertion from partially occurring. That is, while it is possible to prevent a storage battery from being completely inserted into a battery housing portion in a normal fashion, it is impossible to prevent the storage battery from being partly inserted into a battery housing portion, making it difficult for the user to notice the reverse insertion. Some users forcedly press in the storage battery to insert it, thereby causing the machine and the user to be damaged or injured, respectively.

Therefore it is a primary feature of the illustrative embodiments of the present invention to provide a novel storage battery and a battery housing portion.

It is another feature of the illustrative embodiments to provide a structure for preventing the reverse insertion of a storage battery, and a storage battery and a battery housing portion to be used for the same purpose. The illustrative embodiments allow the user to easily notice a prospective reverse insertion, and to effectively and reliably prevent reverse insertion of the storage battery and reverse connection of electrode terminals beforehand.

In an illustrative embodiment, structure for preventing the reverse insertion of a storage battery to be inserted into a battery housing portion is formed in electronic appliances of various types. The storage battery comprises a housing; a groove portion formed on one end surface in a first direction of the housing; a pair of electrode terminals provided on the one end surface of the housing formed with the groove portion; and an engaging concave portion formed in the vicinity of the other end surface in the first direction on an upper surface of the housing. The battery housing portion comprises a housing concave portion capable of housing the storage battery; a pair of connection terminals formed on one inner wall in the first direction of the housing concave portion to be connected to the electrode terminals of the storage battery; a convex portion formed in a protruded manner at a position corresponding to the groove portion on the one inner wall of the first direction of the housing concave portion; and an engaging protrusion formed in a protruded manner at a position corresponding to the engaging concave portion on the one inner wall of the first direction of the housing concave portion. When the storage battery is normally inserted into the battery housing portion, the groove portion and the convex portion are engaged with each other, the engaging concave portion and the engaging protrusion are engaged with each other, and the electrode terminals and the connection terminals are electrically connected to each other.

One aspect of the exemplary embodiments is directed to a storage battery used to be detachably inserted into a battery housing portion formed with a pair of connection terminals, a convex portion, and an engaging protrusion within a housing concave portion for housing the storage battery. The storage battery comprises a housing; a groove portion formed on one end surface in a first direction of the housing; a pair of electrode terminals provided on the one end surface of the housing formed with the groove portion; and an engaging concave portion formed in the vicinity of the other end surface in the first direction on an upper surface of the housing. When the storage battery is normally inserted into the battery housing portion, the groove portion and the convex portion are engaged with each other, the engaging concave portion and the engaging protrusion are engaged with each other, and the electrode terminals and the connection terminals are electrically connected to each other.

Another aspect of the exemplary embodiments is directed to a battery housing portion into which a storage battery having a housing, a groove portion formed on one end surface in a first direction of the housing, a pair of electrode terminals provided on the one end surface of the housing formed with the groove portion, and an engaging concave portion formed in the vicinity of the other end surface on an upper surface of the housing is inserted. The battery housing portion comprises a housing concave portion capable of housing the storage battery; a pair of connection terminals formed on one inner wall in the first direction of the housing concave portion to be connected to the electrode terminals of the storage battery; a convex portion formed in a protruded manner at a position corresponding to the groove portion on the one inner wall of the first direction of the housing concave potion; and an engaging protrusion formed in a protruded manner at a position corresponding to the engaging concave portion on the one inner wall of the first direction of the housing concave portion. When the storage battery is normally inserted into the battery housing portion, the groove portion and the convex portion are engaged with each other, the engaging concave portion and the engaging protrusion are engaged with each other, and the electrode terminals and the connection terminals are electrically connected to each other.

According to one exemplary embodiment, the storage battery is formed with the groove portion on one end surface (side surface) in a longitudinal direction of the housing and the engaging concave portion is formed in the vicinity of the other end surface on the upper surface of the housing. The battery housing portion is formed with the convex portion on the inner wall of the housing concave portion at the position corresponding to the groove portion of the storage battery, and the engaging protrusion on the inner wall of the housing concave portion is formed at the position corresponding to the engaging concave portion of the storage battery. When inserting the storage battery into the battery housing portion, the storage battery is to be inserted obliquely such that the groove portion on the one end surface of the storage battery can be engaged with the convex portion in a state that the engaging concave portion is engaged with the engaging protrusion, and thus, the storage battery is pushed. When the user accidentally intends to insert the storage battery reversely, the user can notice the reversal insertion early in the insertion process because of failure of normal engagement between the engaging concave portion and the engaging protrusion. In this manner, it is possible to prevent the reverse insertion of the storage battery early in the insertion process.

The illustrative embodiments are operable to effectively prevent the reverse insertion of the storage battery and reverse connection of the electrode terminals. Furthermore, a plurality of reverse insertion preventing portions allow the user to visually recognize the structure of the reverse insertion with ease, to prevent damage to appliances and injury of the user occurring due to a forced reverse insertion of the storage battery.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

FIGS 1(a)–1(c) are cross-sectional views showing states where a storage battery in accordance with one exemplary embodiment of the present invention is inserted into a battery housing portion. Specifically, FIG. 1(a), FIG. 1(b) and FIG. 1(c) respectively show a slate before inserting the storage battery, a state with the storage battery being positioned oblique for insertion, and a state with the storage battery normally inserted. FIG. 2(a), FIG. 2(b) and FIG. 2(c) respectively show a side view, a top plan view, and a bottom view of a storage battery in accordance with an exemplary embodiment of the present invention. FIG. 3 is a top plan view where an exemplary battery housing portion of one embodiment of the invention is applied to a battery charger.

Figure 1:
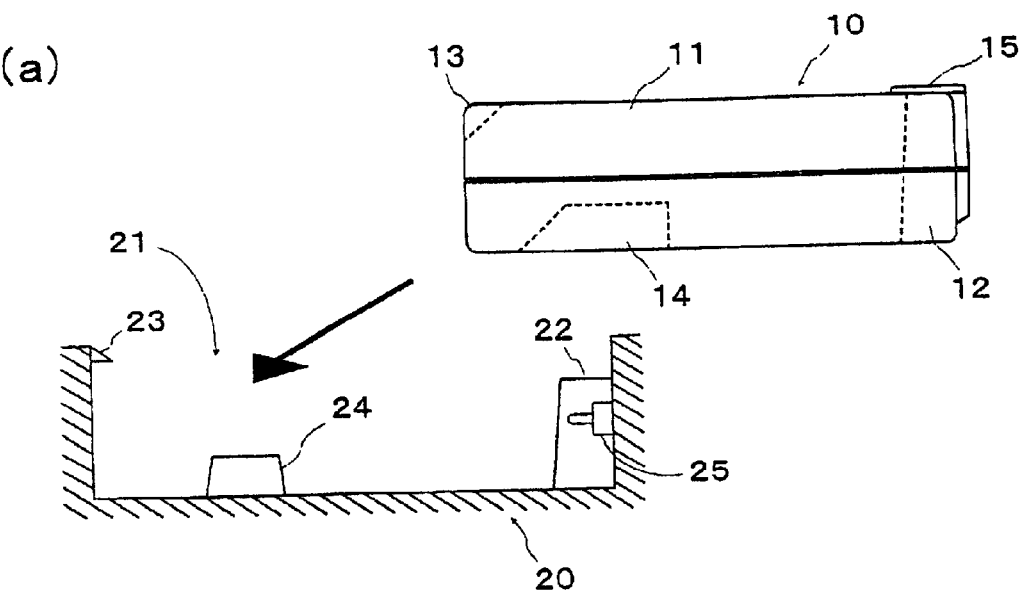
FIGS. 1(a)–1(c) are cross-sectional views showing states when a storage battery of one exemplary embodiment of the present invention is inserted into a battery housing portion.
Figure 1:
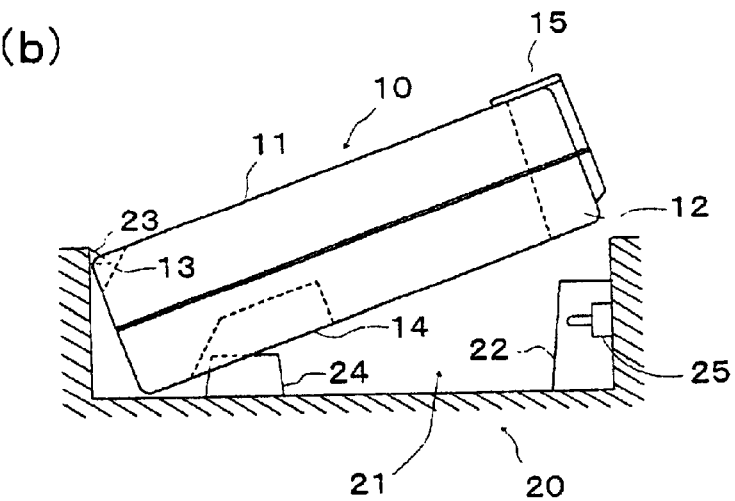
Figure 1:
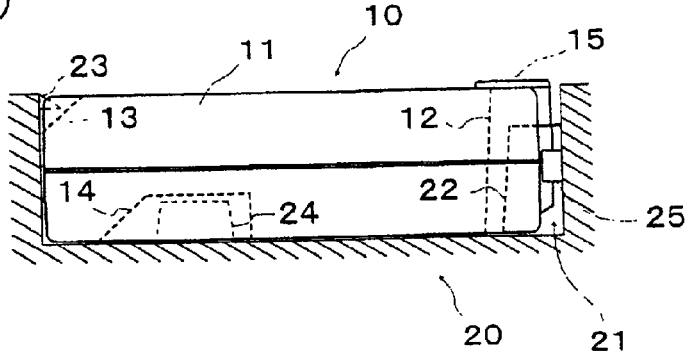
Figure 2:
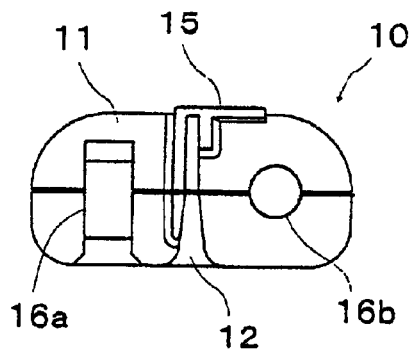
FIGS. 2(a)–2(c) are illustrative views showing the storage battery in accordance with one embodiment of the present invention.
Figure 2:
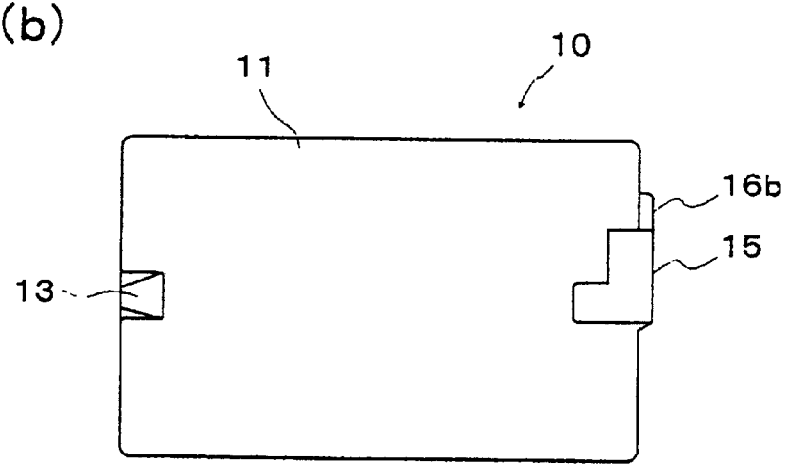
Figure 2:
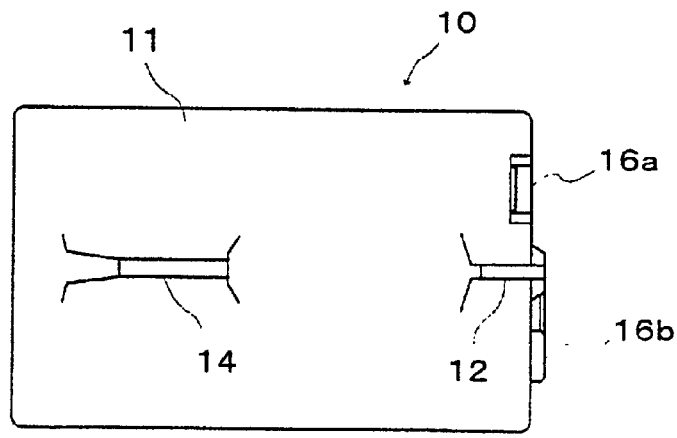
Figure 3:
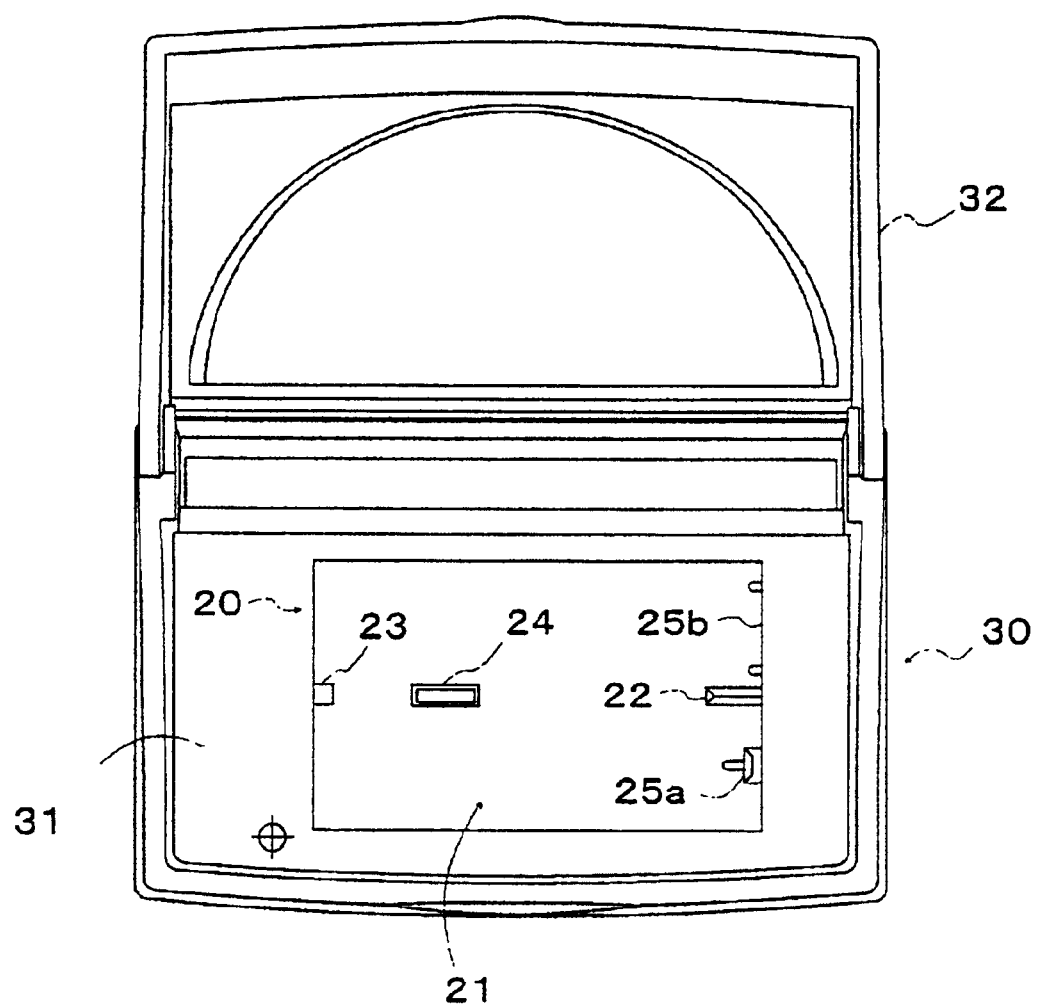
FIG. 3 is a top plan view of the battery housing portion of one embodiment of the present invention when applied to a battery charger.

Referring to FIGS. 1 and 2, the storage battery 10 includes a housing 11. The housing 11 is formed with a groove portion 12 for preventing reverse insertion on the one end surface (side surface) in the longitudinal (the first) direction of the housing 11, and a pair of electrode terminals 16a and 16b in such a manner that the groove portion 12 is sandwiched between them. The groove portion 12 is formed such that an opening portion thereof becomes progressively larger toward the bottom side (downwardly) to be readily engaged with a convex portion 22 formed on the battery housing portion 20. The battery housing 11 is formed with a first engaging concave portion 13 in the vicinity of the other end surface (side surface) in the longitudinal direction on the upper surface thereof. The first engaging concave portion 13 is formed in a notch oblique from the upper surface to the other end surface of the housing 11. Furthermore, the housing 11 is formed with a second engaging concave portion 14 on the bottom portion. The second engaging concave portion 14 is formed with a trapezium-shaped recess or hollow when viewed from the front at such a position a little nearer the other end surface than the center of the bottom. A surface of a insertion direction side of the housing 11 is obliquely shaped in such a manner that the width of an opening portion of the second engaging concave portion 14 is wider than that of a second engaging protrusion 24 formed on the bottom of the after-mentioned battery housing portion 20 in order that the storage battery 10 can be smoothly inserted into the battery housing portion 20. Furthermore, the housing 11 is formed with a knob portion 15 on the upper end portion of the one side of the longitudinal direction of the housing 11.

Referring to FIGS. 1 and 3, the battery housing portion 20 has a housing concave portion 21 having a plane shape little larger than that of the battery 10 in order to insert the battery 10 thereinto. The housing concave portion 21 is formed with a convex portion 22 to be engaged with the groove portion 12 of the storage battery 10 in a protruded manner on the inner wall of the one side of the longitudinal direction thereof. The housing concave portion 21 is formed with a first engaging protrusion 23 to be engaged with the first engaging concave portion 13 on the upper portion of the inner wall of the other side of the longitudinal direction thereof. Furthermore, the housing concave portion 21 is formed with a second engaging protrusion 24 to be engaged with the second engaging concave portion 14 in a manner protruding upwardly from the bottom. It is noted that the housing concave portion 21 is formed with a pair of connection terminals 25a and 25b for electrically connecting to electrode terminals 16a and 16b such that the convex portion 22 is sandwiched between them. In addition, the above illustrative embodiment shows the case where the second engaging concave portion 14 and the second engaging protrusion 24 are formed nearer the other side surface (leftish) rather than the center of the longitudinal direction, but these portions 14 and 24 alternatively may be formed nearer the one side surface (rightish) oppositely.

Referring to FIG. 1, the storage battery 10 is inserted into the battery housing portion 20 as follows. When inserting the storage battery 10 in the battery housing portion 20, the battery of FIG. 1(a) is moved to the position shown in FIG. 1(b). The storage battery 10 is first inserted into the battery housing concave 21 with one side surface of the housing 11 inclined a little downwardly than the other side surface in such a manner that the first engaging concave portion 13 is oriented obliquely downwardly to be engaged with the first engaging protrusion 23 from the top of the battery housing portion 20. Then, as shown in FIG. 1(c), pushing the other side surface of the housing 11 downwardly, the storage battery 10 is inserted into the battery housing portion 20 while the groove portion 12 of the storage battery 10 is guided by the convex portion 22. At this time, since the surface of the inserting side of the second engaging concave portion 14 is cut off obliquely, smooth engagement is obtained without being caught by the second engaging protrusion 24. Upon inserting the storage battery 10 into the battery housing portion 20, the electrode terminals of the storage battery 10 and the connection terminals of the battery housing portion 20 are brought into contact with each other, and electrically connected to each other.

Accordingly, in the storage battery 10 is inserted into the battery housing portion 20, positioning is firstly performed in a state that the first engaging concave portion 13 is engaged with the first engaging protrusion 23. Then, since the groove portion 12 is guided by the convex portion 22, and at the same time, the second engaging concave portion 14 is inserted into the second engaging protrusion 24 with engagement therebetween, it is possible to reliably notice early in the insertion process any reverse insertion, to thereby prevent the storage battery from being forcedly pushed-in.

When the user intends to insert the storage battery into the battery storage portion 20 with the one end surface and the other end surface of the longitudinal direction of the housing 11 inverted, i.e., with the surface formed with the groove 12 down, since the first engaging concave 13 is not formed on the end surface or side surface formed with the groove 12 of the housing 11, it is impossible to engage the first engaging concave portion 13 with the first engaging protrusion 23, and the second engaging protrusion 24 is brought into contact with the bottom surface of the storage battery 10 and the convex portion 22 is also brought into contact with the other end surface not formed with the groove 12 of the housing 11. Thus, it is possible to notice early in the reverse inversion process before a part of the storage battery is inserted into the battery housing portion 20, to thereby prevent the reverse insertion early and reliably.

In accordance with the illustrative embodiment, the groove portion 12, the first engaging concave 13 and the second engaging concave 14 are formed on the housing 11 of the storage battery 10 and the concave portion 22, the first engaging protrusion 23 and the second engaging protrusion 24 at the positions respectively corresponding to the groove portion 12, the first engaging concave 13 and the second engaging concave 14 are formed on the housing concave portion 21 of the battery housing portion 20. Thus, even when the user accidentally intends to insert the storage battery 10 upside down or laterally inverted, because the groove portion 12, the first engaging concave 13, and the second engaging concave 14 are not engaged with the convex portion 22, the first engaging protrusion 23, and the second engaging protrusion 24, it is possible to reliably prevent the reverse insertion of the storage battery 10 into the battery housing portion 20. When the one end surface of the longitudinal direction of the housing 11 of the storage battery 10 is pushed into the battery housing portion 20, i.e. the storage battery 10 is completely housed in the battery housing portion 20, the electrode terminals 16a and 16b of the storage battery 10 and the connection terminal 25 of the battery housing portion 20 are in contact to be electrically connected to each other. Accordingly, it is possible to prevent the electrical connection with the storage battery 10 inserted into the battery housing portion 20 by halves. Furthermore, a plurality of concave portions (convex portions protrusions) for preventing the reverse insertion allow the user to visually recognize the structure of the reverse insertion with ease, to thereby prevent the reverse insertion of the storage battery 10 before it occurs. Accordingly, damage of the appliance and the injury to the user occurring due to the reverse insertion of the storage battery 10 can be prevented.

It is noted when the user intends to remove the storage battery 10 from the battery housing portion 20, it can be removed by holding and lifting the knob portion 15 formed on the upper end portion of one side of the longitudinal direction of the housing 11.

Referring to FIG. 3, a battery charger includes a housing 31. The housing 31 has a cover 32 openably formed on the one side surface and the above described battery housing portion 20 is integrally provided at the center thereof. When charging the storage battery 10 with the charger 30, the cover 32 is closed, and a plug (not shown) formed on the bottom of the battery is inserted in a socket for commercial power in a state where the storage battery 10 is normally inserted into the battery housing portion 20 in a manner that the groove portion 12, first engaging concave portion 13, and second engaging concave portion 14 formed on the housing 11 of the storage battery 10 are respectively engaged with the convex portion 22, first engaging protrusion 23, and second engaging protrusion 24 formed on the housing concave portion 21 of the battery housing portion 20.

Figure 4:
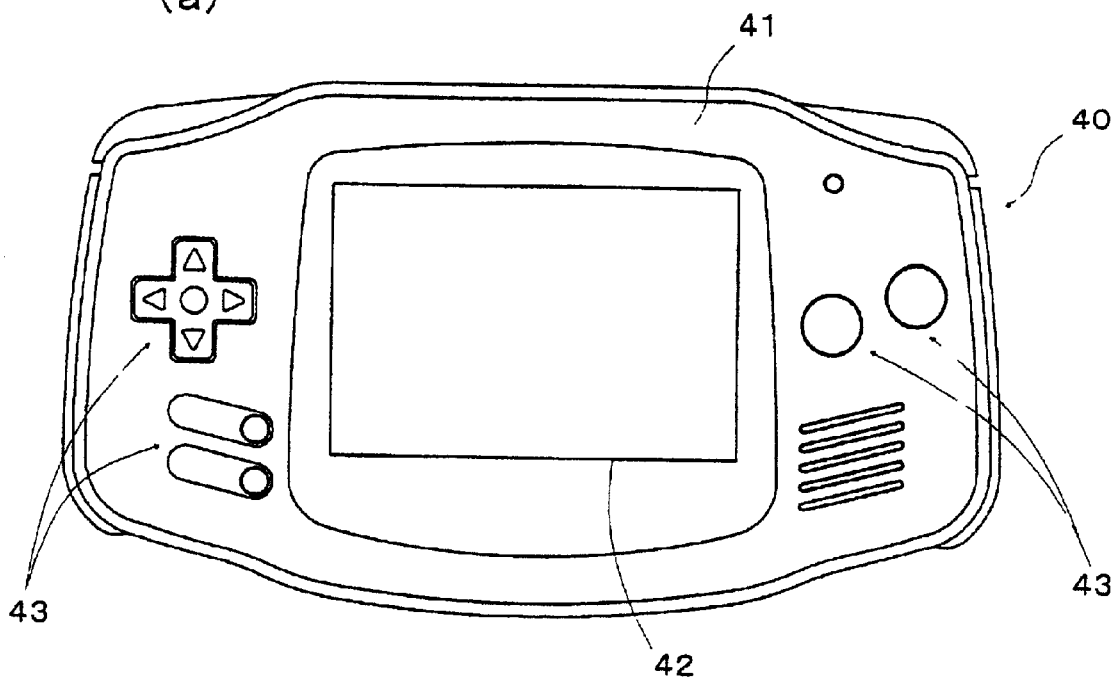
FIGS. 4(a) and 4(b) are illustrative views showing the battery housing portion in accordance with one embodiment of the present invention when applied to a portable electronic game machine.
Figure 4:
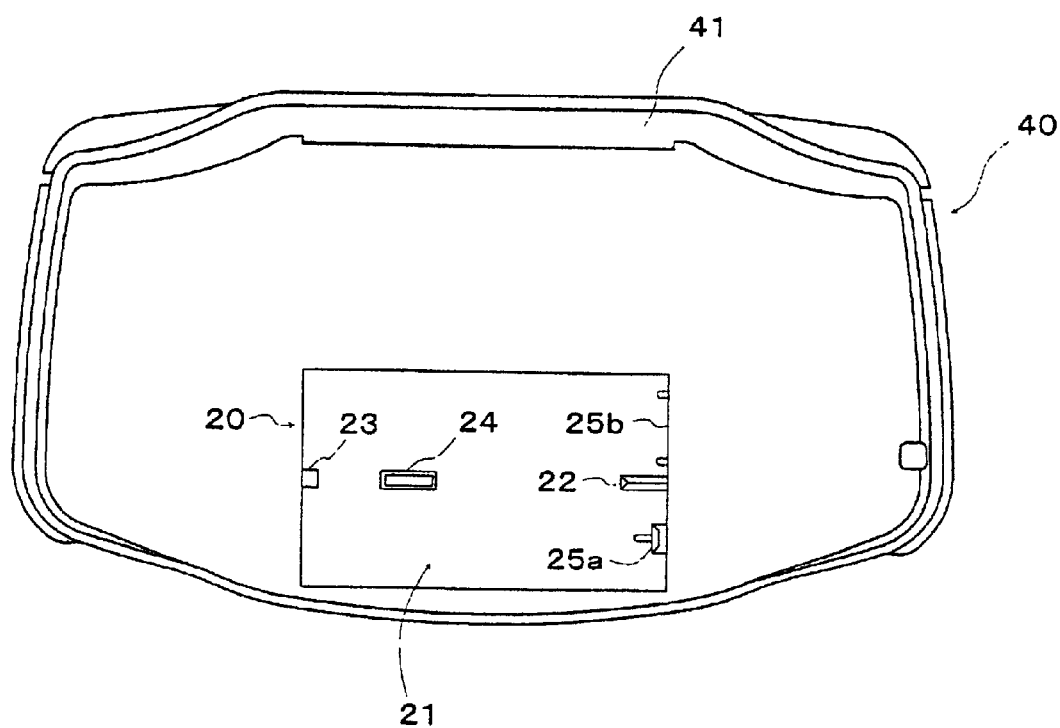

FIG. 4 is a view showing the case the battery housing portion of one embodiment of the invention when applied to a portable electronic game machine as an example of an electronic appliance. Specifically, FIG. 4(a) and FIG. 4 (b) show a front view and a rear view of the portable electronic game machine, respectively. Referring to FIG. 4 (a), the portable electronic game machine 40 is provided with an LCD display portion 42 for displaying an image of games, etc. on the surface of a housing 41 and an operating portion 43 on both sides of the housing 41. Meanwhile, the housing has a slot or an insertion port (not shown) for detachably inserting a cartridge (not shown) storing a game program at the upper surface thereof.

Next, referring to FIG. 4 (b), the housing 41 has the previously described battery housing portion 20 integrally formed at a lower portion of the rear thereof. Using the portable electronic game machine 40, a cover (not shown) is closed and a power switch (not shown) is turned on with the storage battery 10 normally inserted into the battery housing portion 20.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Apparatus for preventing the reverse insertion of a storage battery into a battery receiving housing portion formed in an electronic appliance, said storage battery, comprising:
　a battery housing;
　a battery groove portion formed on one end surface of said battery housing;
　a pair of battery electrode terminals provided on said one end surface of said housing formed with said groove portion; and
　an engaging portion of said battery formed in the vicinity of another end surface on an upper surface of said battery housing, and said battery receiving housing portion, comprising:
　a battery receiving housing portion capable of housing said storage battery;
　a pair of connection terminals formed on one inner wall of said battery receiving housing portion to be connected to said electrode terminals of said storage battery;

a protruding portion formed at a position corresponding to said groove portion on an upper portion of one inner wall of said battery receiving housing portion; and a receiving housing engaging protrusion formed at a position corresponding to said battery engaging portion on one inner wall of said battery receiving housing portion, wherein when said another end surface of said storage battery is slantingly inserted to another inner wall of said battery receiving housing said engaging portion and said protruding portion are engaged with each other so as to be positioned, and said battery groove portion and said protruding portion are engaged with each other by plunging said one end surface of said storage battery down, whereby said storage battery is housed within said battery housing portion and said electrode terminals and said connection terminals are electrically connected to each other.

2. Apparatus according to claim 1, wherein said engaging portion of said storage battery is slantingly notched from an upper surface of said battery housing to said another end surface of said battery housing, and said battery groove portion is formed in a manner that a width of an opening is made larger as going toward a lower surface of said battery housing.

3. Apparatus according to claim 1, wherein said storage battery is provided with on an upper end portion of said battery housing a pinching portion for taking said storage battery out of said battery receiving portion.

4. Apparatus according to claim 1, wherein said storage battery is further provided with a second engaging portion formed on a bottom surface of said battery housing and by slantingly cutting said bottom surface as a side near said another end surface, said battery receiving portion is further provided with a second receiving housing engaging protrusion formed at a position corresponding to said second engaging portion on a bottom surface of said battery receiving portion with a width narrower than a width of said second engaging portion, and when said storage battery is housed within said battery receiving portion said second engaging portion and said second battery housing engaging protrusion are engaged with each other.

5. A storage battery to be detachably inserted into a battery housing portion having inner walls and a pair of connection terminals formed on one of said inner walls, a protruding portion formed on said one of said inner walls, and a engaging protrusion formed on an upper portion of another of said inner walls, comprising:

a housing:

a groove portion formed at a position corresponding to said protruding portion on one end surface of said housing;

a pair of electrode terminals provided on said one end surface of said housing to be connected to said connection terminals; and an engaging portion formed at a position corresponding to said engaging protrusion in the vicinity of another end surface on an upper surface of said housing, wherein when said another end surface of said storage battery is slantingly inserted to another inner wall of said battery receiving housing said engaging portion and said protruding portion are engaged with each other so as to be positioned, and said groove portion and said protruding portion are engaged with each other by plunging said one end surface of said storage battery down, whereby said storage battery is housed within said battery housing and said electrode terminals and said connection terminals are electrically connected to each other.

6. A battery housing portion into which a storage battery having a housing, a groove portion formed on one end surface of said housing, a pair of electrode terminals provided on said one end surface of said housing formed with said groove portion, and an engaging portion formed in the vicinity of other end surface on an upper surface of said housing is inserted, comprising:

a housing portion for housing said storage battery;

a pair of connection terminals formed on one inner wall of said housing portion to be connected to said electrode terminals of said storage battery;

a protruding portion formed at a position corresponding to said groove portion on one inner wall of said housing potion; and an engaging protrusion formed at a position corresponding to said engaging portion on one inner wall of said housing concave portion, wherein when said another end surface of said storage battery is slantingly inserted to another inner wall of said battery receiving housing said engaging portion and said protruding portion are engaged with each other so as to be positioned, and said grove portion and said protruding portion are engaged with each other by plunging said one end surface of said storage battery down, whereby said storage battery is housed within said battery housing and said electrode terminals and said connection terminals are electrically connected to each other.

* * * * *